(12) United States Patent
Singh et al.

(10) Patent No.: US 8,301,333 B2
(45) Date of Patent: Oct. 30, 2012

(54) EVENT-DRIVEN FAULT DIAGNOSIS FRAMEWORK FOR AUTOMOTIVE SYSTEMS

(75) Inventors: Satnam Singh, Bangalore (IN); Rahul Chougule, Bangalore (IN); Pulak Bandyopadhyay, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 300 days.

(21) Appl. No.: 12/730,883

(22) Filed: Mar. 24, 2010

(65) Prior Publication Data

US 2011/0238258 A1 Sep. 29, 2011

(51) Int. Cl.
*G01M 17/00* (2006.01)
*G06F 7/00* (2006.01)
*G06F 19/00* (2006.01)

(52) U.S. Cl. ...................................... 701/31.4
(58) Field of Classification Search .................. 701/31.4, 701/31.8, 31.5, 32.1, 32.9
See application file for complete search history.

(56) References Cited

U.S. PATENT DOCUMENTS

| | | | | |
|---|---|---|---|---|
| 7,904,219 B1* | 3/2011 | Lowrey et al. | ................ | 701/32.3 |
| 2002/0007237 A1* | 1/2002 | Phung et al. | ..................... | 701/33 |
| 2002/0133273 A1* | 9/2002 | Lowrey et al. | .................. | 701/29 |
| 2003/0216889 A1* | 11/2003 | Marko et al. | ................... | 702/182 |
| 2005/0080606 A1* | 4/2005 | Ampunan et al. | ................. | 703/8 |
| 2009/0037045 A1* | 2/2009 | Ampunan et al. | ............... | 701/35 |
| 2009/0177350 A1* | 7/2009 | Williams et al. | ................. | 701/29 |
| 2011/0071725 A1* | 3/2011 | Kleve et al. | ..................... | 701/33 |
| 2012/0004804 A1* | 1/2012 | Beams et al. | ................ | 701/32.7 |

* cited by examiner

*Primary Examiner* — Mary Cheung
*Assistant Examiner* — Michael D Lang
(74) *Attorney, Agent, or Firm* — John A. Miller; Miller IP Group, PLC

(57) ABSTRACT

Systems and methods for capturing and analyzing significant parameter data from vehicle systems whenever a diagnostic trouble code (DTC) is triggered. A multi-dimensional matrix is constructed, with vehicles, DTCs, and parameter data comprising three dimensions of the matrix. The data matrix is populated with DTC and parameter data from many different vehicles, either when vehicles are taken to a dealer for service, or via wireless data download. Time can be added as a fourth dimension of the matrix, providing an indication of whether a particular system or component is temporally degrading. When sufficient data is accumulated, the data matrix is preprocessed, features are extracted from the data, and the features are classified, using a variety of mathematical techniques. Trained classifiers are then used to diagnose the root cause of any particular fault signal, and also to provide a prognosis of system health and remaining useful life.

16 Claims, 5 Drawing Sheets

EVENT-DRIVEN FAULT DIAGNOSIS FRAMEWORK FOR AUTOMOTIVE SYSTEMS

BACKGROUND OF THE INVENTION

1. Field of the Invention

This invention relates generally to a system and method for diagnosing fault conditions in a vehicle and, more particularly, to a system and method for capturing operating parameter data whenever a diagnostic trouble code (DTC) is triggered in a vehicle, and applying mathematical models to both the parameter data and the DTC data to diagnose the reason for the fault condition.

2. Discussion of the Related Art

Modern vehicles are complex electrical and mechanical systems that employ many components, devices, modules, sub-systems, etc. that pass operating information between and among each other using sophisticated algorithms and data buses. As with anything, these types of devices and algorithms are susceptible to errors, failures and faults that affect the operation of the vehicle. When such errors and faults occur, often the affected device or component will issue a fault code, such as a diagnostic trouble code (DTC), that is received by one or more system controller identifying the fault, or some ancillary fault with an integrated component. These DTCs can be analyzed by service technicians and engineers to identify problems and/or make system corrections and upgrades. However, given the complexity of vehicle systems, many DTCs and other signals could be triggered for many different reasons, which could make trouble-shooting particularly difficult.

As mentioned above, modern vehicles have a number of mechanical and electrical parts that are in electrical communication through various controllers. If a certain actuator, sensor or sub-system is not operating properly, the component or sub-system, or its controller, will typically provide a DTC that is received by a system controller, such that the DTC can be either downloaded using telematics services, such as OnStar™, or diagnostic devices during service of the vehicle. However, a DTC can be triggered for a variety of reasons and based on many different combinations of measured parameters. This often makes it difficult to diagnose the true root cause of a problem based on a DTC value alone. This can result in the inability to find or repeat a problem when the vehicle is being serviced, which leads to customer dissatisfaction, increased future warranty costs, and missed opportunities to improve system designs based on real-world failure modes.

Given the unacceptably high rate of missed diagnoses of vehicle faults using current techniques, there is a need to improve the fault diagnosis of vehicle systems by capturing more operating parameter data when a DTC is triggered and applying advanced mathematical techniques to that data to find the true root cause of any fault condition.

SUMMARY OF THE INVENTION

In accordance with the teachings of the present invention, systems and methods are disclosed for capturing and analyzing significant parameter data from vehicle systems whenever a diagnostic trouble code (DTC) is triggered. A multi-dimensional data matrix is constructed, with vehicles and DTCs comprising the first two dimensions, and a set of operating parameter values, scan tool values, customer complaints, and text-based symptoms comprising the third dimension of the matrix. The data matrix is populated with DTC, operating parameter, and other data from many different vehicles which have experienced fault events, either when vehicles are taken to a dealer for service, or via telematics data download. Time can be added as a fourth dimension of the matrix, providing an indication of whether a particular system or component is temporally degrading. When sufficient data is accumulated, the data matrix is pre-processed, features are extracted from the data, and the extracted features are classified, using a variety of mathematical and statistical techniques. Trained classifiers are then used to diagnose the root cause of other fault events, and also to provide a prognosis of system health and remaining useful life.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an event-driven fault diagnosis framework for automotive systems is merely exemplary in nature, and is in no way intended to limit the invention or its applications or uses. For example, the present invention has particular application for vehicle fault diagnosis. However, the method of the invention will have other applications for other industries, such as fault diagnosis in the aerospace, heavy equipment, and other transportation industries.

Figure 1:
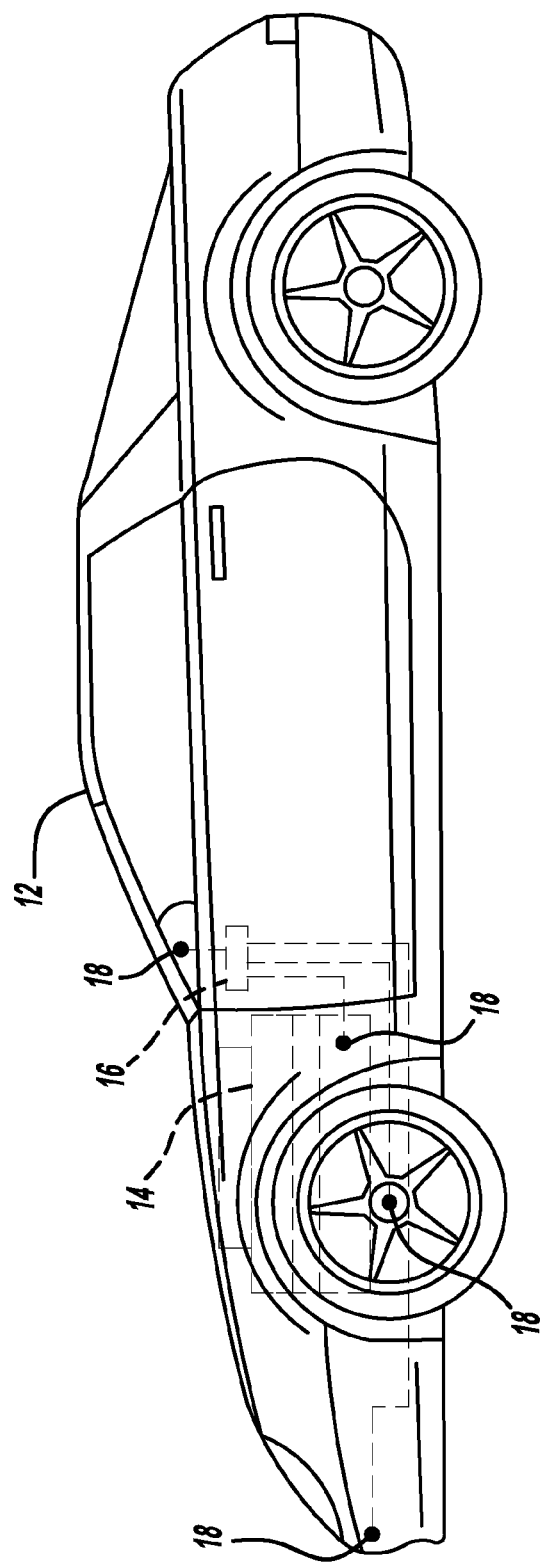
FIG. 1 is a diagram of a vehicle with sensors and a controller for capturing fault-related data to be used in a fault diagnosis framework.

FIG. 1 is a diagram of a vehicle 12 with onboard equipment needed for capturing fault-related data. The vehicle 12 includes an engine 14, and numerous other systems and sub-systems, such as suspension, steering, transmission and driveline, thermal management, entertainment, and security systems. Each of these systems is typically comprised of many sub-systems and components, which must be in good working condition in order for the parent system to function properly. Any modern vehicle 12 will include one or more controller 16, for monitoring and controlling the various vehicle systems and sub-systems. The vehicle 12 will also include many onboard sensors 18 for measuring a wide range of system and component parameters, including temperatures, pressures, voltages, forces, fluid flow rates, fluid levels, and others. The sensors 18 pass their parameter data to the controller 16 via electronic networks, which may be wired or wireless. The controller 16 includes memory for storing parameter data, and a processor configured with algorithms for controlling the various vehicle systems and sub-systems.

In the vehicle 12, parameter data from the sensors 18 is monitored continually. The controller 16 is programmed to check the values of many different parameters and combinations of parameters, to see if the values are within normal ranges. If a parameter or combination of parameters is detected to be outside its normal range, one or more fault code, or diagnostic trouble code (DTC), is triggered and stored in the controller 16. For example, a fuel tank pressure sensor circuit which is reading out of its range may trigger a circuit-level DTC. This problem would likely be fairly easily diagnosed as either a bad fuel tank pressure sensor or a faulty wiring connection from the fuel tank pressure sensor to the controller 16. On the other hand, an engine misfire may trigger one or more subsystem-level DTCs. The misfire condition may be very difficult to diagnose and correct, as it could be caused by a problem with the fuel or the fuel injection system, an ignition system problem, a wiring problem, a mechanical problem somewhere in the engine 14, or some other issue. The objective of the present invention is to capture as much relevant data as possible whenever a DTC is triggered, and analyze that data both for the purpose of resolving each individual vehicle problem and also for the purpose of identifying and correcting systemic design issues.

Figure 2:
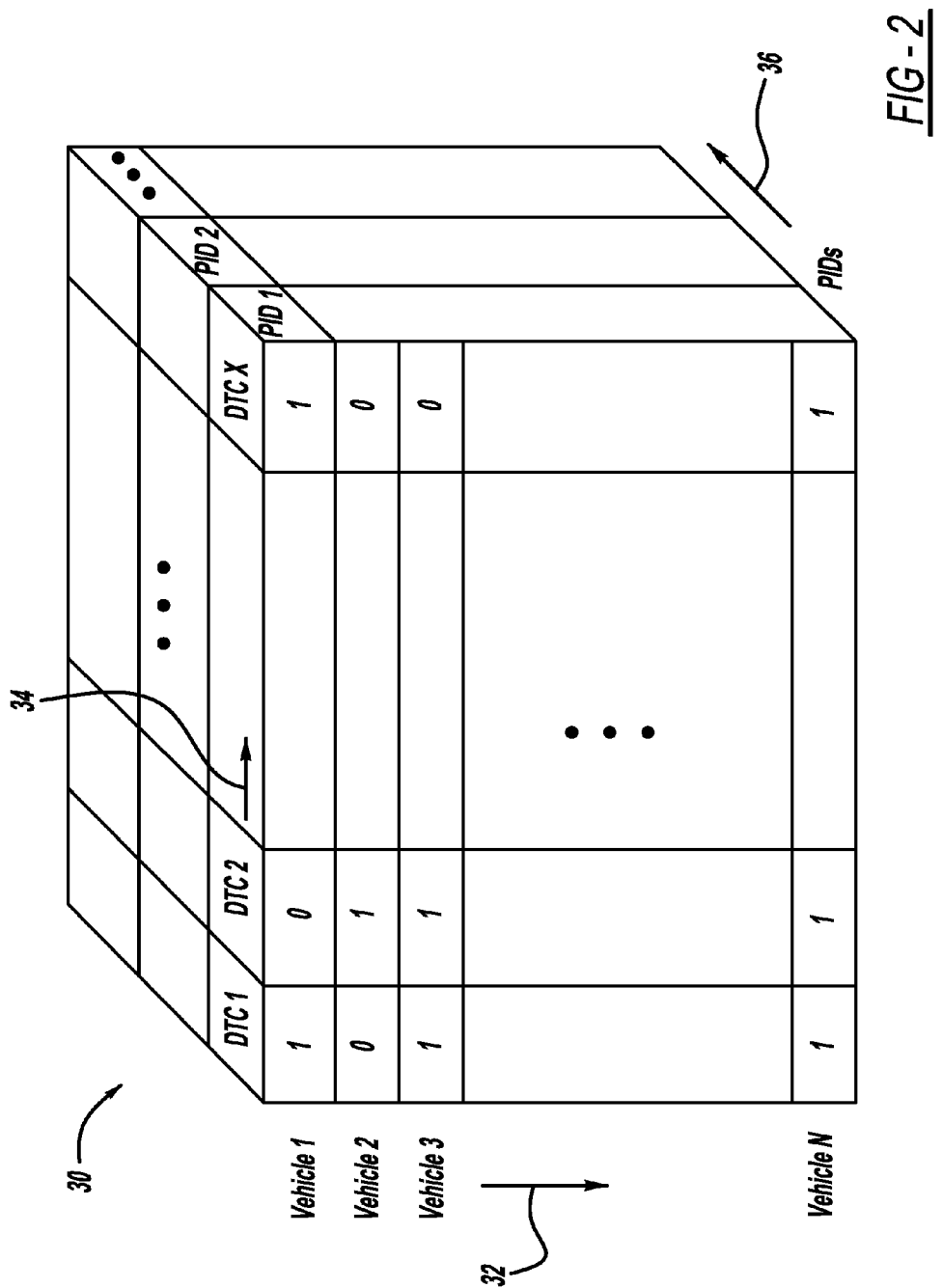
FIG. 2 is a diagram of an event-driven data matrix used to organize fault-related data used for fault diagnosis.

To achieve the desired objective, a three-dimensional data matrix is proposed. FIG. 2 is a diagram of a data matrix 30 used for collecting and organizing event-driven fault data. The data matrix 30 includes vehicles as a first dimension 32, DTCs as a second dimension 34, and parameter identification data (PID) as a third dimension 36. Vehicles can be identified by their vehicle identification number (VIN), or any other suitable identifier. DTCs must have a unique identifier or numbering scheme. There may be hundreds of different DTCs associated with any particular vehicle platform. PIDs must also have a unique identifier or numbering scheme. There are typically thousands of parameters or PIDs that may be captured on any engine or vehicle family. Commonly used PIDs include engine rpm, vehicle speed, engine coolant temperature, intake manifold pressure, fuel pressure, and battery voltage, for example. Throughout the ensuing discussion, the term PID is used generically to refer both to single parameter values, such as engine rpm, as well as to arrays or "packets" of related parameters, sometimes known as data packet identifiers (DPIDs).

In order to construct the data matrix 30, it is necessary to define which PIDs should be captured for each DTC. Many DTCs call for dozens, or even hundreds of specific PIDs to be captured. This relationship is typically defined by an engineer responsible for the system to which the DTC relates. Thus, the matrix 30 is constructed by defining for a given vehicle platform which DTCs are applicable, and for each DTC which PIDs should be captured. The data matrix 30 can then be populated with event data from individual vehicles in service when a DTC is triggered.

Figure 3:
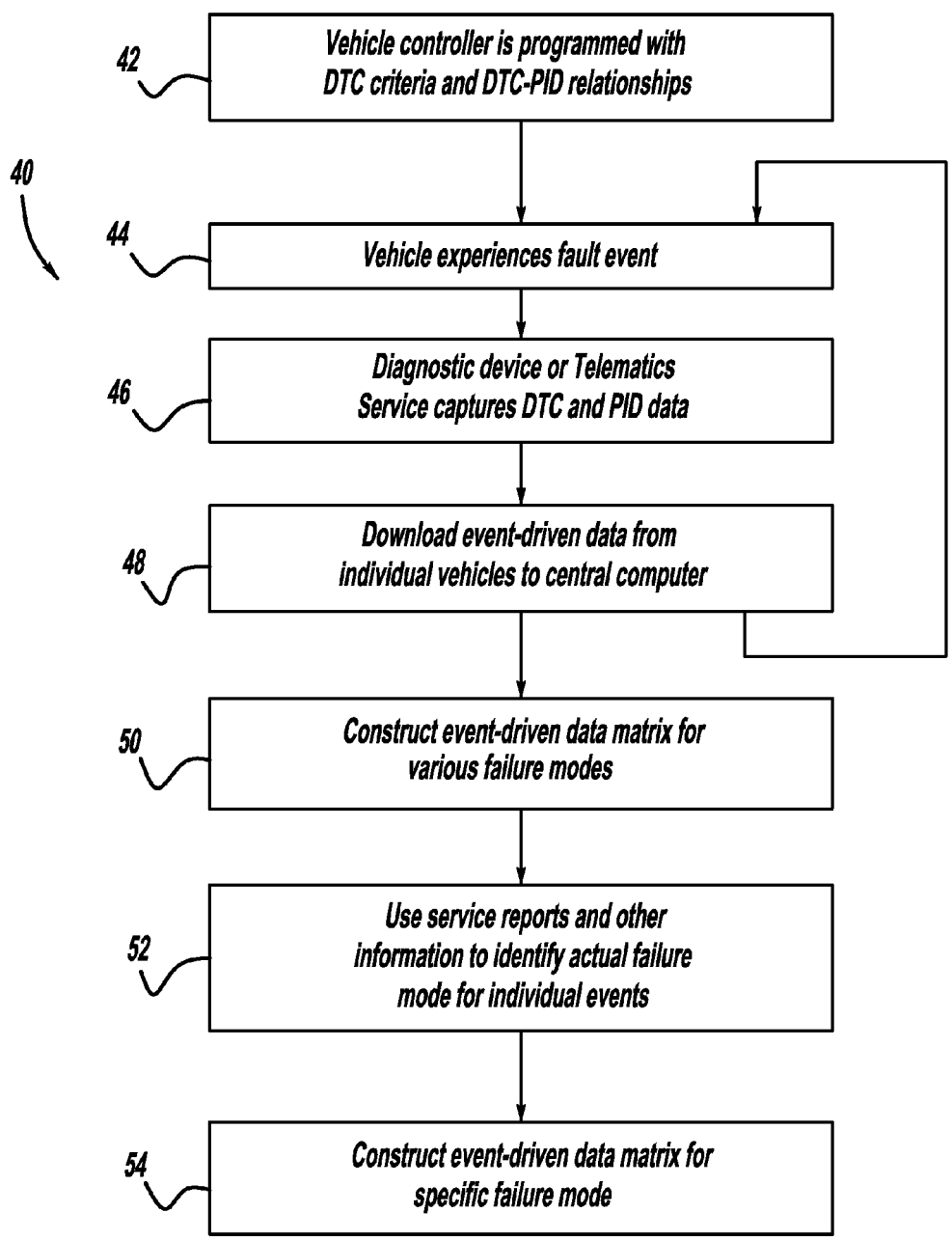
FIG. 3 is a flow chart diagram of a process used for capturing vehicle fault event data and downloading it to a central computer.

FIG. 3 is a flow chart diagram 40 of a process for capturing DTC and PID data and populating data matrices. The process begins at box 42 where any particular vehicle's controller 16 is programmed with criteria for triggering DTCs, and with a list of PIDs that should be captured when any given DTC is triggered. For example, a particular DTC may be defined to trigger if certain combinations of conditions exist, such as engine oil pressure being below a certain value while engine rpm is coincidentally within a certain range. As mentioned previously, hundreds of DTCs and their criteria are applicable to most vehicles. Also, for each DTC, a set of PIDs is defined, such that all of the prescribed PID data is captured in a "freeze frame" fashion when any particular DTC is triggered. The process continues at box 44 when a vehicle 12 experiences a fault event, or a problem which triggers one or more DTC. At box 46, the DTC(s) and associated PID data are captured in the controller 16 for the event. At box 48, the individual event data is downloaded to a central computer containing a master copy of the data matrix. The data download can occur when the vehicle 12 is taken to a dealer for service, or the data download can be handled at any time via a wireless communication or telematics system. The activities of the boxes 44, 46, and 48 continue on an ongoing basis as more individual vehicles experience fault events, capture DTC and PID data, and download that data to the computer which hosts the master copy of the data matrix. At box 50, the master data matrix is populated with DTC and PID data from different vehicle events. The PID data can also be supplemented with other relevant information about the fault, such as data taken by diagnostic tools at a service center, and customer feedback regarding the event.

At this stage, the matrix contains data from events representing many different vehicle system failure modes. It is then necessary to use actual field diagnosis data to segregate the event-specific DTC and PID data by failure mode. At box 52, field service reports, customer observations, and other data are used to identify the actual failure mode, where possible, for each individual event data record. It is then possible to construct event-driven data matrices for specific failure modes at box 54, where each failure-mode-specific data matrix contains the vehicle, DTC, and PID data for events known to have one specific failure mode. Failure-mode-specific data matrices can be constructed for as many different failure modes as data is available to support. For example, one failure-mode-specific data matrix may be populated with DTC and PID data for events which are diagnosed as being caused by a fuel tank pressure (FTP) sensor low voltage failure, another matrix may be created for events where the failure mode is diagnosed to be a FTP sensor high voltage failure, and so forth. After event-driven data matrices are populated with sufficient data for several specific failure modes, an analysis process may be undertaken.

The analysis process of the present invention takes place in two phases—a training phase, and a testing phase. In the training phase, various mathematical and statistical tools are used to analyze the data in the failure-mode-specific data matrices, identify characteristic features of the data, and classify the data features by failure mode. The training phase includes a machine learning technique known as trained classifiers to identify failure-mode-specific patterns in the data. In the testing phase, individual vehicle fault event data is analyzed and diagnoses are rendered using the trained classifiers from the training phase. The testing phase validates with additional data that the trained classifiers are operating as expected.

Figure 4:
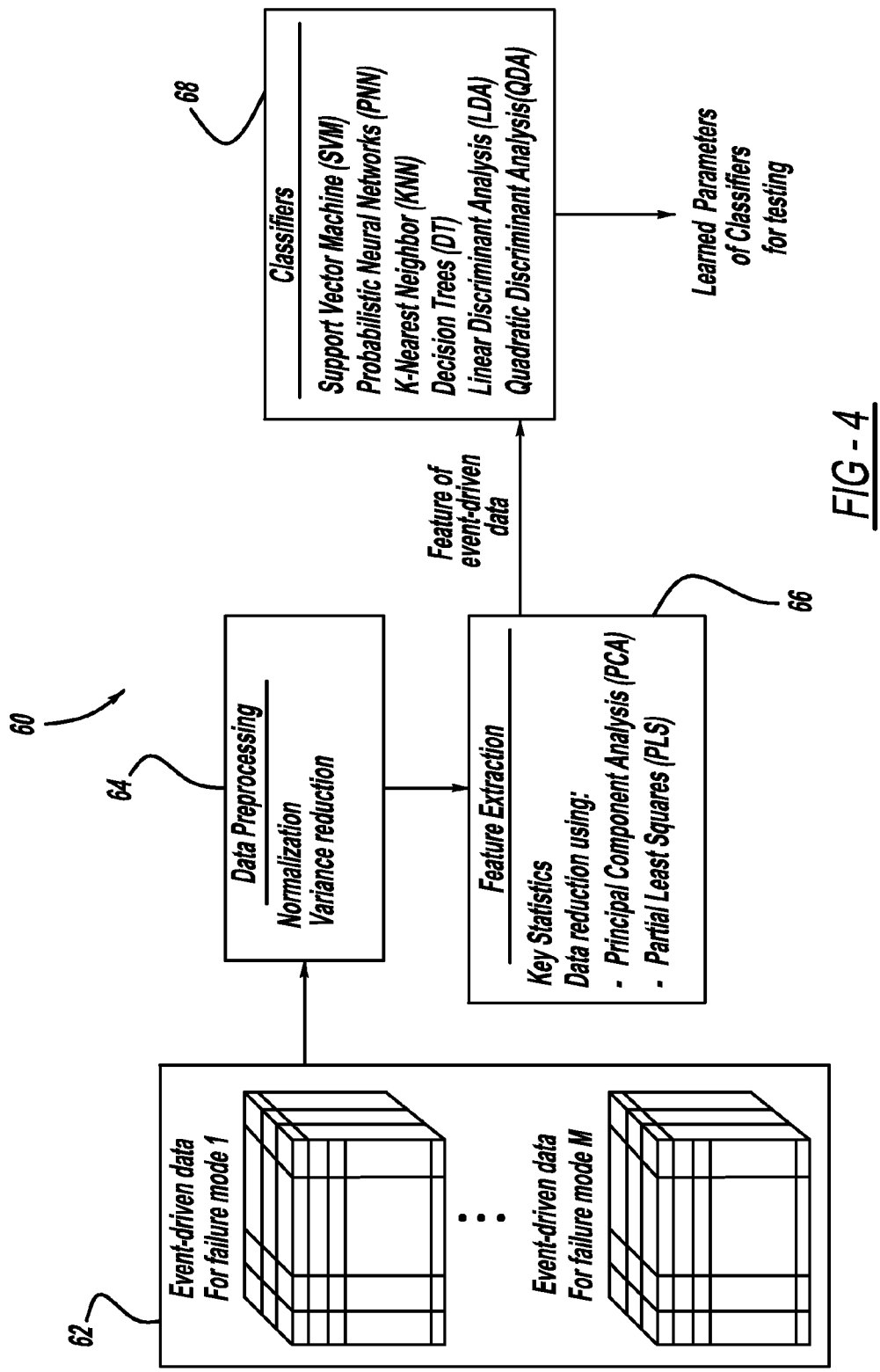
FIG. 4 is a block diagram of a system used for a training phase of the fault diagnosis framework.

FIG. 4 is a block diagram of a system 60 used for the training phase. The training system 60 includes the mathematical and statistical tools and techniques which can be used for preprocessing the data, extracting characteristic features of the data, and training the classifiers to recognize the data features by failure mode. It is described as a training phase because the mathematical models actually learn what parameter settings to use in order to extract the most relevant features of the data and properly classify the data features by actual failure mode. The training system 60 begins with failure-mode-specific data matrices 62. As described above, each of the matrices 62 contains data only for events found to be attributed to one specific failure mode, where the data includes vehicle, DTC, and PID data. The data matrices 62 are provided to a data preprocessing module 64, which uses normalization, variance reduction, and possibly other techniques, to prepare the data matrices 62 for feature extraction. The purpose of the preprocessing module 64 is to minimize or eliminate anomalies in the data, such as errors that might occur during data download from a vehicle to the central computer, which might skew or hinder the data analysis which is about to be undertaken.

A feature extraction module 66 uses several data reduction, transformation, and analysis techniques to identify features of the data from the data matrices 62. Features are characteristics of the data which may be useful for later classifying the data. Examples of techniques used in the feature extraction module 66 include key statistics, and dimension reduction techniques such as principal component analysis (PCA), and partial least squares (PLS). These techniques are all known to those skilled in the art of data analysis and digital signal processing. By automatically applying multiple analysis techniques to the data, the feature extraction module 66 can identify features which might otherwise be missed if only manual or less extensive data analysis techniques were used.

A data classifier module 68 receives the features from the feature extraction module 66 and performs a classification. Classification is a machine learning technique used to predict group membership for data instances. Broadly speaking, the goal of machine learning is for a computer to automatically learn to recognize complex patterns and make intelligent decisions based on data. As applied here, classification will be used to associate patterns in the data features with specific vehicle system failure modes. The data classifier module 68 uses many types of classifiers, including support vector machine (SVM), probabilistic neural networks (PNN), k-nearest neighbor (KNN), decision trees (DT), linear discriminant analysis (LDA), and quadratic discriminant analysis (QDA). These techniques, or combinations of them known as fusions, are also known to those skilled in the art, and have been shown to be able to identify patterns in the data features which are indicative of failure mode. The output of the classifier module 68 is the cumulative learning of the entire training system 60. This includes; the parameters and settings used in the data preprocessing module 64; the techniques and parameters used in, and the features resulting from, the feature extraction module 66; and the classifiers used, the parameters learned, and the classification patterns detected in the classifier module 68.

The testing phase is used to validate the classifiers which were trained, in a machine learning sense, in the training phase. That is, the testing phase will verify that the trained classifiers are effective in identifying failure-mode-specific patterns in the data and reaching a proper diagnosis for additional event-based data. As a general rule of thumb, of the total amount of event data available in the failure-mode-specific data matrices 62, about two-thirds of it should be used for the training phase, and the remaining one-third should be used for the testing phase.

Figure 5:
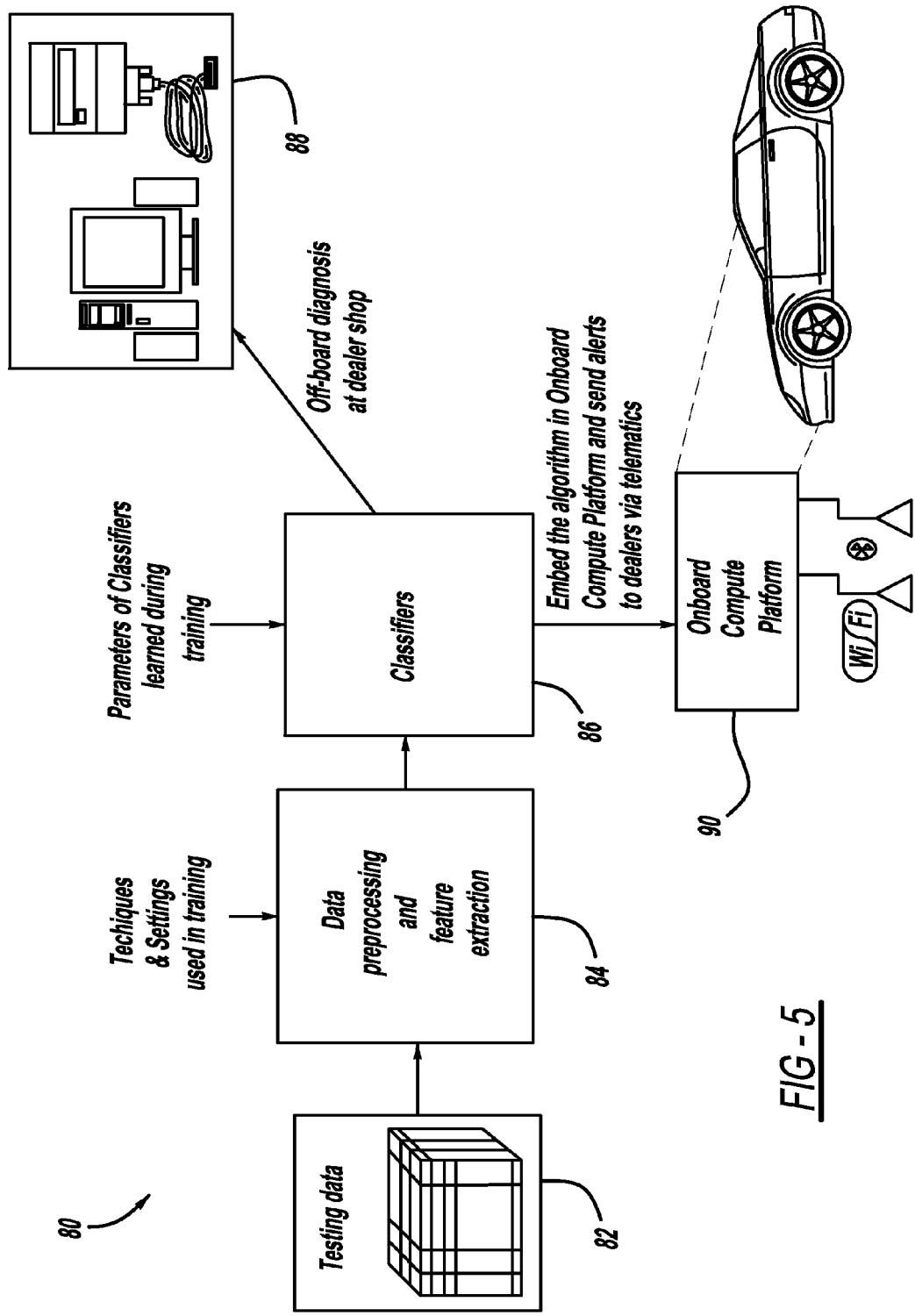
FIG. 5 is a block diagram of a system used for a testing phase of the fault diagnosis framework.

FIG. 5 is a block diagram of a system 80 used for the testing phase. The testing system 80 begins with a testing data matrix 82. The testing data matrix 82 can include event data for multiple different known failure mode events, or it can contain only data for events known to be caused by a single specific failure mode. In either case, the testing phase will be used to verify that the trained classifiers reach the proper diagnosis for each event in the testing data matrix 82. A data preprocessing and feature extraction module 84 operates in the same way as the modules 64 and 66 from the training system 60, using the same techniques and settings used for feature extraction in the training system 60. This ensures that the features extracted from the testing data matrix 82 will be comparable to the features extracted from the failure-mode-specific data matrices 62 which were used in the training phase. Features extracted from the module 84 are passed to trained classifier module 86, which is configured with the parameters learned during the training phase. That is, the outcome of the training phase is that specific classifiers have been trained, in a machine learning sense, to recognize patterns in the feature data associated with specific failure modes. In the testing phase, the trained classifiers are used in the module 86 to diagnose failure modes for each specific event in the testing data matrix 82.

Once the trained classifiers in the module 86 are tested and shown to reliably diagnose failure modes for specific DTC events, the feature extraction and classifier modules can be deployed, onboard vehicles or otherwise, for fault isolation. The most immediate benefit can be gained by using the classifiers to diagnose the root causes of individual vehicle fault events as they occur. The classifiers can be applied to fault diagnosis in two ways. First, the diagnostic patterns can be downloaded to computers 88 at vehicle service centers, so that when a vehicle 12 which has experienced a fault event is brought to the service center for repair, the DTC and PID data will be downloaded from the vehicle 12 to the service center computer 88, the diagnostic pattern will be recognized by the service center computer 88, and the diagnosis will be provided to the service technician. Another way the data classification can be used for fault diagnosis is by downloading the diagnostic patterns directly to computers 90 onboard individual vehicles 12. The computer 90 could be the same device as the controller 16, or it could be a different device. If the onboard computer 90 is programmed with the trained classifiers necessary to recognize diagnostic data patterns, then when a fault event occurs and DTC and PID data is captured, it is possible for the onboard computer 90 to immediately diagnose the true root cause of the fault. This in turn would allow further action to be taken, such as reconfiguring or deactivating fault-affected systems, or notifying the driver that the vehicle 12 should be taken to a dealer soon for service. Wireless communication or telematics systems could also be used to relay an onboard vehicle diagnosis, along with the associated DTC and PID data, to a vehicle service center. The service center could then contact the vehicle's owner, explain the situation to the owner, and possibly schedule an appointment for service.

The results of fault data analysis and classification can also be applied to future product designs. For example, data analysis with the methods described above may reveal a recurring problem with the reliability or durability of a hardware component, or the operation of a software component, leading to a conclusion that the offending component should be re-designed for a future vehicle program. Applying field service data from an existing fleet of vehicles to future vehicle designs is nothing new, but the methods of the present invention allow for improved diagnosis of the root cause of faults while reducing the incidence of mis-diagnosis, thus making it much more apparent which faults occur on which vehicles under what circumstances. With existing fault data analysis methods, some types of faults may never be diagnosed with sufficient accuracy and frequency to enable a future design improvement. For example, the offending component mentioned above may never have been identified as being problematic previously, because system faults may not have been properly diagnosed in many cases. The methods of the present invention result in far clearer information which can be used in failure modes and effects analysis (FMEA) and applied to future vehicle designs.

The data matrix 30 can also be extended to a fourth dimension, with the fourth dimension being time. Time data can be measured in any suitable time scale, preferably an absolute time scale which includes a year, a day number within the year, an hour, a minute, and a second. A time stamp would be recorded for every DTC event entry in the data matrix 30.

Then, if a DTC event occurred for a second time on an individual vehicle, parameter data could be evaluated to see if anything changed significantly over time. For example, consider a fuel tank pressure (FTP) sensor intermittent DTC event which occurred thrice, with a month of elapsed time between the three events. In this example, the DTC event was triggered when the engine control module detected an abrupt FTP PID change. If the FTP voltage PID has an increasing or decreasing trend during these three events, this could indicate that either the FTP sensor reference port is getting obstructed, or that an FTP sensor circuit low voltage or high voltage problem will be occurring in the near future on that vehicle. This example illustrates in very simple terms how the time data can be used to enhance the types of analysis and diagnosis which are possible from the data matrix 30. Much more sophisticated analyses are possible, including using the temporal data to provide a prognosis of system health and remaining useful life. Remaining useful life data can then be used by a vehicle service center to make a recommendation to a vehicle owner for repairing or replacing the system or component which is degrading.

The methods and systems described above provide an improved diagnosis framework for vehicle system faults, while not requiring any additional hardware to be included on vehicles. The improved fault diagnosis information can provide immediate benefit to a vehicle's owner through rapid diagnosis and correction of any problem, and can enable a vehicle manufacturer to improve customer satisfaction, reduce warranty costs, and improve future product designs.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for diagnosing causes of faults in vehicle systems, said method comprising:
    defining a plurality of diagnostic trouble codes which are applicable to various fault conditions in a vehicle's systems, criteria for triggering each diagnostic trouble code, and a list of parameter identification data which should be captured for each diagnostic trouble code;
    providing a controller onboard a vehicle which is programmed with the diagnostic trouble codes and the criteria for triggering each diagnostic trouble code, and which is also programmed with the list of parameter identification data which should be captured for each diagnostic trouble code;
    providing sensors onboard the vehicle as needed to capture the parameter identification data;
    capturing the diagnostic trouble code and parameter identification data by the controller when a fault condition occurs in a vehicle system, where each fault condition occurrence is known as a fault event;
    downloading the diagnostic trouble code and parameter identification data from the controller on the vehicle to a central computer;
    storing diagnostic trouble code and parameter identification data for fault events from multiple vehicles on the central computer, where each fault event has an actual failure mode attributed to it;
    analyzing the diagnostic trouble code and parameter identification data from the fault events stored on the central computer using mathematical models which can learn to correlate features in the data with the actual failure mode for each fault event, including a training phase and a testing phase; and
    using the mathematical models to diagnose a failure mode for additional fault events, including downloading the mathematical models after the training and testing phases to a computer at a vehicle repair service center, and using the mathematical models to diagnose a failure mode for fault events on vehicles which are brought to the vehicle repair service center for diagnosis.

2. The method of claim 1 wherein the training phase includes:
    providing input data comprising a matrix of data for each of a plurality of failure modes, where each matrix of data identifies the failure mode to which it pertains, and includes diagnostic trouble code and parameter identification data for fault events from a plurality of vehicles;
    using a pre-processing module to normalize and reduce variation in the input data;
    using a feature extraction module to extract characteristic features of the input data;
    using a classifier module to identify patterns in the features of the input data and associate the patterns with the actual failure mode; and
    storing techniques and settings used in the feature extraction module and the classifier module which most effectively correlate the input data with the actual failure modes.

3. The method of claim 2 wherein the feature extraction module includes at least one of the techniques comprising key statistics, principal component analysis, and partial least squares.

4. The method of claim 2 wherein the classifier module includes at least one of the techniques comprising support vector machine, probabilistic neural networks, k-nearest neighbor, decision trees, linear discriminant analysis, and quadratic discriminant analysis.

5. The method of claim 2 wherein the testing phase includes:
    providing a testing data matrix which includes diagnostic trouble code and parameter identification data for fault events from a plurality of vehicles, where each fault event has the actual failure mode attributed to it;
    using the pre-processing module, the feature extraction module, the classifier module, and the stored techniques and settings from the training phase to produce a diagnosed failure mode for each fault event; and
    verifying that the stored techniques and settings from the training phase are effective with the testing data matrix by comparing the diagnosed failure mode with the actual failure mode for each fault event.

6. The method of claim 5 further comprising downloading the mathematical models after the training and testing phases to a computer onboard a vehicle, and using the mathematical models to diagnose a failure mode for fault events on said vehicle.

7. The method of claim 1 wherein the diagnostic trouble code and parameter identification data also includes a time stamp for each fault event.

8. The method of claim 7 further comprising using the diagnostic trouble code and parameter identification data and the time stamp for each fault event to make a prognosis of system health and remaining useful life for any system involved in the fault event.

9. The method of claim 1 wherein the actual failure mode for each fault event is provided by a vehicle repair service center which has resolved the fault condition.

10. A method for diagnosing causes of faults and making a prognosis of system health in vehicle systems, said method comprising:

defining a plurality of diagnostic trouble codes which are applicable to various fault conditions in a vehicle's systems, criteria for triggering each diagnostic trouble code, and a list of parameter identification data which should be captured for each diagnostic trouble code;

providing a controller onboard a vehicle which is programmed with the diagnostic trouble codes and the criteria for triggering each diagnostic trouble code, and which is also programmed with the list of parameter identification data which should be captured for each diagnostic trouble code;

providing sensors onboard the vehicle as needed to capture the parameter identification data;

capturing the diagnostic trouble code and parameter identification data by the controller when a fault condition occurs in a vehicle system, where each fault condition occurrence is known as a fault event, and data captured for each fault event also includes a time stamp;

downloading the diagnostic trouble code and parameter identification data and time stamps from the controller on the vehicle to a central computer;

storing diagnostic trouble code and parameter identification data and time stamps for fault events from multiple vehicles on the central computer, where each fault event has an actual failure mode attributed to it;

analyzing the diagnostic trouble code and parameter identification data from the fault events stored on the central computer using mathematical models which can learn to correlate features in the data with the actual failure mode for each fault event, including a training phase and a testing phase;

using the mathematical models to diagnose a failure mode for additional fault events; and using the diagnostic trouble code and parameter identification data and the time stamp for each fault event to make a prognosis of system health and remaining useful life for any system involved in the fault event.

11. The method of claim 10 wherein analyzing the diagnostic trouble code and parameter identification data includes a training phase, where the training phase includes:

providing input data comprising a matrix of data for each of a plurality of failure modes, where each matrix of data identifies the failure mode to which it pertains, and includes diagnostic trouble code and parameter identification data for fault events from a plurality of vehicles;

using a pre-processing module to normalize and reduce variation in the input data;

using a feature extraction module to extract characteristic features of the input data, where the feature extraction module includes at least one of the techniques comprising key statistics, principal component analysis, and partial least squares;

using a classifier module to identify patterns in the features of the input data and associate the patterns with the actual failure mode, where the classifier module includes at least one of the techniques comprising support vector machine, probabilistic neural networks, k-nearest neighbor, decision trees, linear discriminant analysis, and quadratic discriminant analysis; and storing techniques and settings used in the feature extraction module and the classifier module which most effectively correlate the input data with the actual failure modes.

12. The method of claim 11 wherein analyzing the diagnostic trouble code and parameter identification data includes a testing phase, where the testing phase includes:

providing a testing data matrix which includes diagnostic trouble code and parameter identification data for fault events from a plurality of vehicles, where each fault event has the actual failure mode attributed to it;

using the pre-processing module, the feature extraction module, the classifier module, and the stored techniques and settings from the training phase to produce a diagnosed failure mode for each fault event; and verifying that the stored techniques and settings from the training phase are effective with the testing data matrix by comparing the diagnosed failure mode with the actual failure mode for each fault event.

13. A system for diagnosing causes of faults in vehicle systems, said system comprising:

a vehicle with a plurality of systems to be monitored;

a plurality of sensors onboard the vehicle for measuring various conditions in the systems;

a controller onboard the vehicle, where the controller is configured to receive parameter data from the sensors, monitor the parameter data to determine if any fault conditions exist, and capture and store a plurality of parameter data when a fault event occurs;

a central computer for collecting parameter data for fault events from a plurality of vehicles, where the computer uses mathematical models to analyze the parameter data to diagnose failure modes for groups of fault events and for individual fault events, said mathematical models comprising a data pre-processing module including normalization and variance reduction techniques, a feature extraction module including key statistics, principal component analysis, and partial least squares techniques, and a trained classifier module including support vector machine, probabilistic neural networks, k-nearest neighbor, decision trees, linear discriminant analysis, and quadratic discriminant analysis techniques; and a communications system onboard the vehicle for transmitting the parameter data for fault events to the central computer.

14. The system of claim 13 wherein the controller includes a pre-defined list of diagnostic trouble codes, criteria for triggering each diagnostic trouble code, and parameter data to capture and store for each diagnostic trouble code.

15. The system of claim 13 wherein the communications system is a wireless system which can transmit the parameter data to the central computer without the vehicle having to be taken to a vehicle repair service center.

16. The system of claim 13 further comprising a computer onboard the vehicle which is configured to use the mathematical models from the central computer to diagnose a failure mode for any new fault event which occurs on the vehicle's systems.

* * * * *